(12) United States Patent
Doong et al.

(10) Patent No.: US 7,099,323 B1
(45) Date of Patent: Aug. 29, 2006

(54) METHOD, APPARATUS AND SYSTEM FOR MANAGEMENT OF MULTICAST ROUTES FOR A PLURALITY OF ROUTING PROTOCOLS IN A NETWORK DEVICE

(75) Inventors: Janet Doong, Chelmsford, MA (US); Richard Crump, Boston, MA (US); Michael Kinzlmaier, Acton, MA (US)

(73) Assignee: Nortel Networks Limited, (CA)

( * ) Notice: Subject to any disclaimer, the term of this patent is extended or adjusted under 35 U.S.C. 154(b) by 1407 days.

(21) Appl. No.: 09/742,881

(22) Filed: Dec. 20, 2000

(51) Int. Cl.
*H04L 12/28* (2006.01)
*H04L 12/26* (2006.01)

(52) U.S. Cl. .................. 370/390; 370/252; 370/432
(58) Field of Classification Search .............. None
See application file for complete search history.

(56) References Cited

U.S. PATENT DOCUMENTS 5,331,637 A * 7/1994 Francis et al. .............. 370/408
5,517,494 A * 5/1996 Green ........................ 370/408
6,775,709 B1 * 8/2004 Elliott ........................ 709/242
6,778,531 B1 * 8/2004 Kodialam et al. .......... 370/390

* cited by examiner

Primary Examiner—Steven Nguyen
(74) Attorney, Agent, or Firm—McGuinness & Manaras LLP

(57) ABSTRACT

A multicast network device, such as a router, may support a plurality of multicast routing protocols. Each multicast routing protocol maintains its own routing table that stores the multicast routes known to the multicast routing protocol. A unicast routing table may also be included in the network device. Some multicast protocols make us of unicast as well as multicast routes. A single multicast routing table is provided to store the multicast routes for each multicast routing protocol and a selected set of unicast routes form the unicast routing table. Multicast routing table management logic controls the content of the multicast routing table. The single multicast routing table allows for efficient access to the multicast and unicast routes as well as for the exchange of routing information between different multicast routing protocols.

43 Claims, 11 Drawing Sheets

```
wfIpMrtmInjectRtTable OBJECT-TYPE
        SYNTAX  SEQUENCE OF WfIpMrtmInjectRtEntry
        ACCESS  not-accessible
        STATUS  mandatory
        DESCRIPTION
                "The Table of MRTM Inject Unicast routes Policy Rules"
        ::= { wfIpPolicyGroup 21 } wfIpMrtmInjectRtEntry OBJECT-TYPE
    SYNTAX  WfIpMrtmInjectRtEntry
    ACCESS  not-accessible
    STATUS  mandatory
    DESCRIPTION
            "An entry in the Mrtm Inject Route Rule Table"
    INDEX   { wfIpMrtmInjectRtIndex }
    ::= { wfIpMrtmInjectRtTable 1 }

WfIpMrtmInjectRtEntry ::= SEQUENCE {
        wfIpMrtmInjectRtDelete
            INTEGER,
        wfIpMrtmInjectRtDisable
            INTEGER,
        wfIpMrtmInjectRtIndex
            INTEGER,
        wfIpMrtmInjectRtName
            DisplayString,
        wfIpMrtmInjectRtNetworks
            OCTET STRING,
        wfIpMrtmInjectRtAction
            INTEGER,
        wfIpMrtmInjectRtPreference
            INTEGER,
        wfIpMrtmInjectRtPrecedence
            INTEGER,
        wfIpMrtmInjectRtInject
            OCTET STRING,
        wfIpMrtmInjectRtInInterface
            OCTET STRING,
        wfIpMrtmInjectRtType
            INTEGER,
        wfIpMrtmInjectRtMetric
            INTEGER wfIpMrtmInjectRtDelete OBJECT-TYPE
        SYNTAX  INTEGER {
                    create (1),
                    delete (2)
                }
        ACCESS  read-write
        STATUS  mandatory
        DESCRIPTION
                "Create/Delete parameter."
        DEFVAL  { create }
        ::= { wfIpMrtmInjectRtEntry 1 }
```

*FIG. 6A*

```
wfIpMrtmInjectRtDisable OBJECT-TYPE
    SYNTAX  INTEGER {
                enabled (1), disabled (2)
            }
    ACCESS  read-write
    STATUS  mandatory
    DESCRIPTION
            "Enable/Disable parameter."
    DEFVAL  { enabled }
    ::= { wfIpMrtmInjectRtEntry 2 } wfIpMrtmInjectRtIndex OBJECT-TYPE
    SYNTAX  INTEGER
    ACCESS  read-only
    STATUS  mandatory
    DESCRIPTION
            "Rule index number"
    ::= { wfIpMrtmInjectRtEntry 3 } wfIpMrtmInjectRtName OBJECT-TYPE
    SYNTAX  DisplayString
    ACCESS  read-write
    STATUS  mandatory
    DESCRIPTION
            "Rule name - user specified name for this rule"
    ::= { wfIpMrtmInjectRtEntry 4 } wfIpMrtmInjectRtNetworks OBJECT-TYPE
    SYNTAX  OCTET STRING
    ACCESS  read-write
    STATUS  mandatory
    DESCRIPTION
            "Network identification list. This identifies which
            networks will match this rule.  If non-null, the octet
            string contains one or more 3-tuples of this form:

first octet:   exact (1) or range (2)
             next 4 octets: network number
             next 4 octets: network mask An entry with an 'exact' tag means to only match the
            specific network advertisement (number & mask). An
            entry with a 'range' tag means to match any network
            number that falls in the range indicated by the number
            and mask.

A null string also means 'match any route'."

::= { wfIpMrtmInjectRtEntry 5 }
```

FIG. 6B

```
    wfIpMrtmInjectRtAction OBJECT-TYPE
        SYNTAX  INTEGER {
                    accept (1),
                    ignore (3)
                }
        ACCESS  read-write
        STATUS  mandatory
        DESCRIPTION
                "action. 'accept' means that the route should be imported from RTM to  the Mrtm routing table.   'ignore'
                means don't consider the route"
        DEFVAL  { accept }
        ::= { wfIpMrtmInjectRtEntry 6 } wfIpMrtmInjectRtPreference OBJECT-TYPE
    SYNTAX  INTEGER(0..16)
    ACCESS  read-write
    STATUS  mandatory
    DESCRIPTION
            "preference. This is a metric to be used to compare
            the preference path between inject route or the existing
            route in Mrtm routing table. If the injecting unicast
            route is preferred, then the value need to be set higher than
            the preference of the existing route.
            If the injecting unicast route path is preferred,
                        then the value need to be set greater than 0.
            This parameter only has meaning if the action is 'accept'."
    DEFVAL  { 1 }
    ::= { wfIpMrtmInjectRtEntry 7 } wfIpMrtmInjectRtPrecedence OBJECT-TYPE
    SYNTAX  INTEGER
    ACCESS  read-write
    STATUS  mandatory
    DESCRIPTION
            "precedence. This is a metric to be used to compare
            this policy rule to the other rules that a given route may
            match.  A rule with a higher precedence value will be
            chosen over one with a smaller value.  In the case of
            a tie, the rule index is used (larger wins).

Note that the policy match is not most specific
            so the precedence has to be used to select from
            multiple matches."
    ::= { wfIpMrtmInjectRtEntry 8 }
```

*FIG. 6C*

```
wfIpMrtmInjectRtInject OBJECT-TYPE
    SYNTAX  OCTET STRING
    ACCESS  read-write
    STATUS  mandatory
    DESCRIPTION
            "network injection list. this octet string should only be
            non-null if the action is 'accept' and if it is desired to
            insert networks into the routing table that differ from
            the actual advertised network.  For instance, if a number of
            networks in a certain range are learned, an aggregate
            advertisement could be inserted instead of the individual
            networks."

If non-null, The octet string contains one 2-tuples of
            this form:

first  4 octets: network number
            next   4 octets: network mask

Upon receiving a route that matches this filter, the network
            in this list will be considered for the inclusion in the routing
            table.  If the list is null, the actual received network is considered."
    ::= { wfIpMrtmInjectRtEntry 9 } wfIpMrtmInjectRtInInterface OBJECT-TYPE
    SYNTAX  OCTET STRING
    ACCESS  read-write
    STATUS  mandatory
    DESCRIPTION
            "Injected unicast routes inbound circuit list.
            This octet string contains one or more 4-octet IP addresses.
            If an interface address is included in this list, the unicast
            routes received on that interface match this rule will be
            accepted.

If null, this filter applies to the unicast routes received on
            any interface."
    ::= { wfIpMrtmInjectRtEntry 10 }
```

*FIG. 6D*

```
wfIpMrtmInjectRtType OBJECT-TYPE
    SYNTAX  INTEGER {
            static-route (1),
            rip (15),
            egp (16),
            ospf (17),
            bgp (18),
            direct-route (40),
            best-route (41),
            all-route (42)
            }
    ACCESS  read-write
    STATUS  mandatory
    DESCRIPTION
            "Select the injected route type from RTM. The value of each
            route type will be the same as unitcast route type. See
            define in ip_rt_types.h"
    DEFVAL  { best route }
    ::= { wfIpMrtmInjectRtEntry 11 } wfIpMrtmInjectRtMetric OBJECT-TYPE
    SYNTAX  INTEGER (1..31)
    ACCESS  read-write
    STATUS  mandatory
    DESCRIPTION
            "Route Metric. This value represents the cost of the external
            routes which are OSPF or unicast best route  to be injected
            into Mrtm routing table. The default value is set to 1."

DEFVAL  { 1 }
    ::= { wfIpMrtmInjectRtEntry 12 } wfMrtm      OBJECT IDENTIFIER ::= { wfMrtmGroup 1 } wfMrtmCreate  OBJECT-TYPE
    SYNTAX  INTEGER {
            created (1),
            deleted (2)
            }
    ACCESS  read-write
    STATUS  mandatory
    DESCRIPTION
            "Create/Delete a parameter. Default is created.
            Users perform a set operation on this
            object in order to create/delete MRTM table."
    DEFVAL  { created }
    ::= { wfMrtm 1 }
```

*FIG. 6E*

```
wfMrtmEnable  OBJECT-TYPE
    SYNTAX   INTEGER  {
             enabled (1),
             disabled (2)
             }
    ACCESS   read-write
    STATUS   mandatory
    DESCRIPTION
             "Enable/Disable parameter indicates whether
             this MRTM record is enabled or disabled."
    DEFVAL  { enabled }
    ::= { wfMrtm 2 } wfMrtmState  OBJECT-TYPE
    SYNTAX   INTEGER  {
             up (1),
             down (2),
             init (3),
             notpres (4)
             }
    ACCESS   read-only
    STATUS   mandatory
    DESCRIPTION
             "The current state of the entire MRTM."
    DEFVAL  { notpres }
    ::= { wfMrtm 3 } wfMrtmDebug  OBJECT-TYPE
    SYNTAX   INTEGER
    ACCESS   read-write
    STATUS   mandatory
    DESCRIPTION
             "This is a debug field for PGM.  Setting bits
             cause PGM to generate certain log messages.
             This field will NOT restart PGM.
             The follow bits maybe set in any combination
             (LS stands for least significant) :

0x00000001 for no display
             0x00000002 for interface to RTM
             0x00000004 for interface to policy
             0x00000008 for interface to multicast protocols
             0x00000010 for route change or add or delete.
    ::= { wfMrtm 4 }
```

```
wfMrtmHoldDown  OBJECT-TYPE
    SYNTAX   INTEGER (10..60)
    ACCESS   read-write
    STATUS   mandatory
    DESCRIPTION "This value specifies, in seconds, how long a route
        will be held in MRTM table after it becomes unreachable."
DEFVAL  { 10 }
::= { wfMrtm 5 } wfMrtmFifoSize  OBJECT-TYPE
SYNTAX   INTEGER (1..100)
ACCESS   read-write
STATUS   mandatory
DESCRIPTION
        "This value represents the depth of the FIFO
        between RTM and MRTM used for the outstanding route changes.
        The memory will be pre-allocated as the size of
        x times 1000 of FIFO route entry."
DEFVAL  { 5 }
::= { wfMrtm 6 } wfMrtmEstimatedNetworks  OBJECT-TYPE
    SYNTAX   INTEGER (10..200000)
    ACCESS   read-write
    STATUS   mandatory
    DESCRIPTION
            "This parameter indicates the estimated number of routes
            per slot that the router will need to keep in its routing
            table.This value is used for pre-allocating routing tables."
    ::= { wfMrtm 7 } wfMrtmMaxRoutes  OBJECT-TYPE
   SYNTAX   INTEGER
   ACCESS   read-write
   STATUS   mandatory
   DESCRIPTION
           "Max number of routes, per slot. This is used to limit
           the size of routing tables. Note that routes are kept on a
           per-source network basis, independent of multicast group."
   ::= { wfMrtm 8 } wfMrtmActualRoutes  OBJECT-TYPE
   SYNTAX   INTEGER
   ACCESS   read-only
   STATUS   mandatory
   DESCRIPTION
         "Total actual entries currently in the routing table"
   ::= { wfMrtm 9 }
```

US 7,099,323 B1

METHOD, APPARATUS AND SYSTEM FOR MANAGEMENT OF MULTICAST ROUTES FOR A PLURALITY OF ROUTING PROTOCOLS IN A NETWORK DEVICE

CROSS-REFERENCE TO RELATED APPLICATION

This patent application may be related to the following commonly-owned U.S. patent application, which is hereby incorporated by reference in its entirety:

U.S. patent application Ser. No. 09/747,350, entitled METHOD FOR SYNCHRONIZATION OF MULTICAST ROUTING TABLE CHANGES WITH A PLURALITY OF MULTICAST ROUTING PROTOCOLS, filed on even date herewith in the names of Janet Doong and Richard Crump.

FIELD OF THE INVENTION

The invention generally relates to communication networks and, more particularly, the invention relates to the management of multicast routing information for a plurality of routing protocols in a network device.

BACKGROUND OF THE INVENTION

Communication networks may be used to transport information from an information provider to one or more different consumers. A technique known as "multicasting" may be used to send information from an information provider to a select group of consumers over the communication network. Multicasting allows the information provider to transmit a packet of multicast information (herein referred to as a "multicast packet") simultaneously to all consumers in the multicast group. The multicast packet is addressed to the multicast group using a multicast address. Examples of applications that use multicasting are sending an e-mail message to a mailing list, teleconferencing and videoconferencing.

FIG. 1 is a block diagram of an exemplary prior art network device 107, such as a router, in a multicast communication network. When a multicast packet 102 is received by the router 107 from a network 101 to be forwarded, the routes associated with the multicast packet need to be determined by the router 107. The router runs a multicast routing protocol associated with the multicast packet to determine the next hop for the multicast packet based on the multicast packet's address information. Examples of multicast routing protocols are Distance Vector Multicast Routing Protocol (DVMRP), Multiprotocol extensions to Border Gateway Protocol (MBGP), Multicast Open Shortest Path First (MOSPF), and Protocol Independent Multicast (PIM). As shown in FIG. 1, each multicast routing protocol supported by the router 107 typically has its own independently maintained routing table 103–105 that stores the multicast routes known to the specific multicast routing protocol. Each supported multicast routing protocol maintains its own routing table by exchanging route update messages through its own multicast networks. Some multicast routing protocols, such as MOSPF and PIM, also make use of unicast routes from the unicast protocols supported by the router 107. The supported unicast routing protocols have a unicast routing table 106, as shown in FIG. 1, that stores the unicast routes known to the unicast routing protocols supported by the router. Examples of unicast routing protocols are Border Gateway Protocol (BGP), Open Shortest Path First (OSPF) and Routing Information Protocol (RIP).

As mentioned above, when a multicast packet is received by the router 107 to be forwarded, the router 107 needs to determine the routes associated with the multicast packet. The multicast routing protocol associated with the multicast packet will determine the order in which the multicast routing tables 103–105, as well as the unicast routing table if necessary, are accessed and searched to determine the desired route or routes for the multicast packet. Often, each multicast routing table 103–105, as well as the unicast routing table, must be accessed and searched to determine the correct route or routes for the multicast packet. Performing multiple searches involves a significant amount of logic and processing time. In addition, when more than one multicast routing protocol is supported by the router, additional interoperability logic is required to enable the different multicast routing protocols to exchange routing information. The interoperability logic permits one multicast routing protocol to import the routing information of the other multicast routing protocols so that the multicast routing protocol may propagate the other routing protocols' routes in its own network domain.

SUMMARY OF THE INVENTION

In accordance with one aspect of the invention, a method for aggregating and maintaining routing information for a plurality of multicast routing protocols in a network device that includes a routing table for each of the plurality of multicast routing protocols, includes receiving routes submitted by each routing table for the plurality of multicast routing protocols. The routes received are stored in a single multicast routing table. The multicast routing table is updated based on changes made by the plurality of multicast routing protocols to the routes stored in each routing table for the plurality of multicast routing protocols. In one embodiment, the method further includes sorting the routes stored in the multicast routing table based on routing protocol type.

In a further embodiment, the method further includes selecting a set of unicast routes from a unicast routing table and storing the set of unicast routes in a memory buffer. The set of unicast routes are then transferred from the memory buffer to the multicast routing table. In yet another embodiment, transferring the set of unicast routes includes modifying the set of unicast routes based on a set of predetermined criteria. The set of unicast routes to be injected may be selected based on the unicast routing protocol associated with each unicast route in the unicast routing table.

In accordance with another aspect of the invention, an apparatus for aggregating and maintaining routing information for a plurality of multicast routing protocols in a network device includes receiving logic for receiving routes submitted by each routing table for the plurality of multicast routing protocols. The device further includes a multicast routing table for storing the routes received from each routing table for the plurality of multicast routing protocols. Multicast routing table management logic updates the multicast routing table based on changes made by the plurality of multicast routing protocols to the routes stored in each routing table for the plurality of multicast routing protocols. In one embodiment, the multicast routing table management logic includes sorting logic for sorting the routes in the multicast routing table based on routing protocol.

In a further embodiment, the apparatus further includes a memory buffer for storing a set of unicast routes selected from a unicast routing table. The set of unicast routes are transferred from the memory buffer to the multicast routing table. In yet another embodiment, a policy filter is coupled to the memory buffer and the multicast routing table. The policy filter may be used to modify the set of unicast routes based on a set of predetermined criteria. The set of unicast routes may be selected based on the unicast routing protocol associated with each unicast route in the unicast routing table.

In accordance with yet another aspect of the invention, a method for injecting unicast routes from a unicast routing table into a multicast routing table in a network device of a multicast communication network includes selecting a set of unicast routes from the unicast routing table. The set of unicast routes are stored in a memory buffer and then transferred from the memory buffer to the multicast routing table. In one embodiment, transferring the set of unicast routes includes modifying the set of unicast routes based on a set of predetermined criteria.

In accordance with a further embodiment of the invention, an apparatus for injecting unicast routes from a unicast routing table into a multicast routing table in a network device includes selection logic for selecting a set of unicast routes from the unicast routing table. The set of unicast routes are stored in a memory buffer. Transferring logic transfers the set of unicast routes from the memory buffer to the multicast routing table. In one embodiment, the transferring logic includes a policy filter for modifying the set of unicast routes based on a set of predetermined criteria.

In yet another embodiment, a communication system is provided comprising at least one multicast device for forwarding multicast packets using a plurality of multicast protocols. The multicast device includes a single multicast routing table for storing multicast routes for the plurality of multicast protocols. Multicast routing table management logic updates the multicast routing table based on changes made by the plurality of routing protocols to the routes stored in the multicast routing table. The multicast routing table may also store unicast routes related to the plurality of multicast routing protocols.

In accordance with another further embodiment of the invention, a management information base (MIB) for a multicast routing table manager provides management objects for configuring and controlling the multicast routing table manager. The MIB includes management objects for defining a multicast routing table manager including a multicast routing table for storing routes for a plurality of multicast routing protocols. The multicast routing table manager management objects include, among other things, the state of the multicast routing table, the maximum number of routes in the multicast routing table and the total number of routes in the multicast routing table. The MIB also includes management objects for defining a set of rules for the injection of routes into the multicast routing table. The injection rules management objects include, among other things, a rule index number, a rule name, whether to accept or ignore a route and a preference for the rule.

Further embodiments of the invention are implemented as a computer program product having a computer useable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein:

FIGS. 6A–6G show an exemplary management information base for managing a multicast routing table manager in accordance with an embodiment of the invention.

DESCRIPTION OF PREFERRED EMBODIMENTS

An embodiment of the invention aggregates and maintains routing information for a plurality of multicast routing protocols in a network device using a multicast routing table manager ("MRTM") that controls a single multicast routing table. Each multicast routing protocol maintains its own routing table that stores the routes known to the particular multicast routing protocol. In addition, the network device includes a unicast routing table that stores the unicast routes known to each unicast routing protocol supported by the network device. The routes from each independently maintained multicast routing table are submitted to the MRTM that then stores the multicast routes in the MRTM multicast routing table. The unicast routes are selectively injected into the MRTM multicast routing table using a memory buffer and a policy filter. In this manner, the routes for each supported multicast and unicast routing protocol are advantageously stored in a single routing table, the MRTM multicast routing table. When the network device receives a multicast packet to be forwarded, only the MRTM multicast routing table must be accessed and searched to determine the desired route or routes for the multicast packet.

Figure 2:
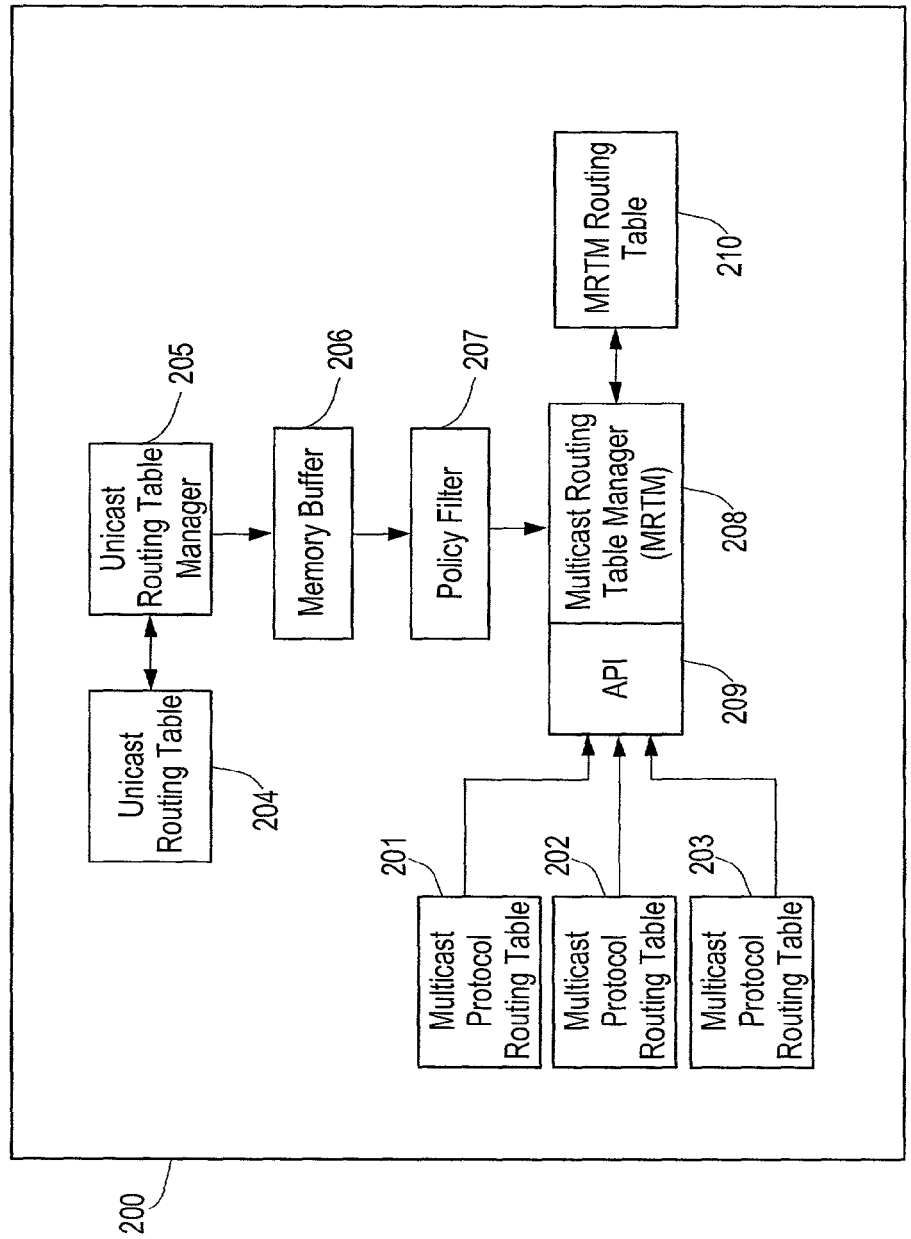
FIG. 2 is a schematic block diagram of a network device including an apparatus for managing routing information for a plurality of multicast routing protocols in accordance with an embodiment of the invention.

FIG. 2 is a schematic block diagram of a network device including an apparatus for managing routing information for a plurality of multicast routing protocols. The router 200 receives multicast packets from a previous network device and forwards the multicast packets to the next hop of the desired route for the multicast packet.

Figure 1:
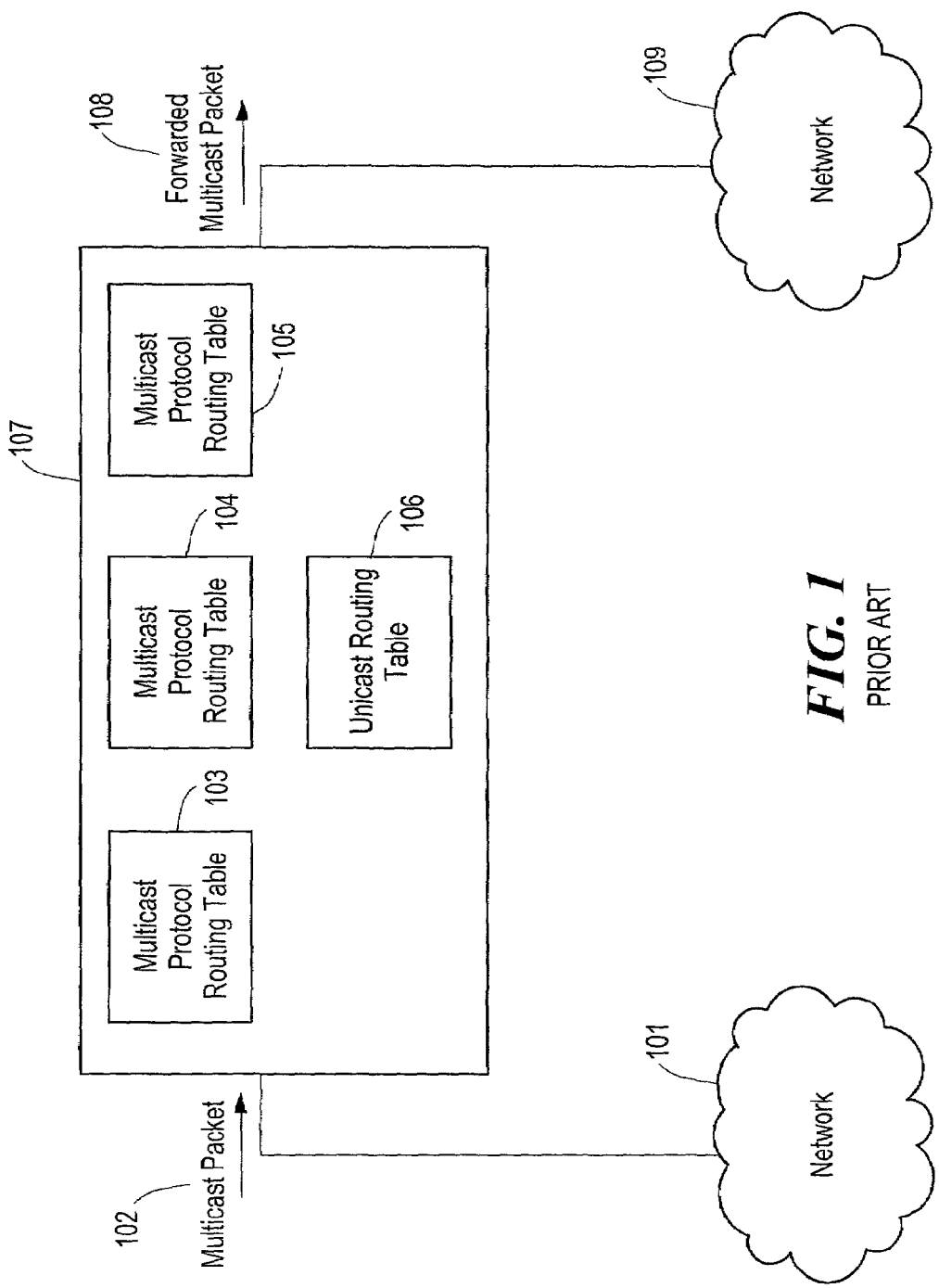
FIG. 1 is a schematic block diagram of an exemplary prior art network device in a multicast communication network.

Router 200 supports a plurality of multicast routing protocols. As discussed above, a multicast routing protocol, such as DVMRP and MBGP, maintains its own routing table that stores the multicast routes known to the multicast routing protocol. Accordingly, router 200 will include an independently maintained routing table 201–203 for each multicast routing protocol supported by the router. In addition, router 200 includes a unicast routing table 204 that stores unicast routes for each unicast routing protocol supported by the router, such as, for example, RIP or OSPF. As mentioned above with respect to FIG. 1, some multicast routing protocols, such as MOSPF and PIM, make use of unicast routes, as well as multicast routes. The unicast routing table 204 is controlled by unicast routing table management logic (RTM) 205.

When router 200 receives a multicast packet to be forwarded, the multicast routing protocol associated with the multicast packet determines the best route or routes for the multicast packet. The multicast routing protocol determines the desired route or routes for the multicast packet by accessing and searching the multicast routing protocol routing tables 201–203 and the unicast routing table 204, if necessary. As discussed previously, often more than one routing table will need to be searched in order to locate the best route or routes. Searching multiple routing tables requires a significant amount of processing time and logic. In order to efficiently access and search the routes known by each supported multicast and unicast routing protocol, router 200 advantageously includes a multicast routing table manager (MRTM) 208 and an associated MRTM routing table 210. The MRTM routing table 210 stores the multicast routes from each multicast protocol routing table 201–203, as well as selected unicast routes from the unicast routing table 204. In this manner, the MRTM provides a common location where all multicast routing protocol routing information may be obtained. The MRTM routing table may be used by each supported multicast routing protocol to access and exchange information with the other supported multicast routing protocols. When the router 200 forwards a multicast packet, only the MRTM routing table 210 must be searched to determine the desired route or routes for the multicast packet.

The content of the MRTM routing table 210 is controlled by the MRTM 208 in conjunction with an application program interface (API) 209 and a management information base (MIB) (not shown). Each multicast protocol routing table 201–203 submits its multicast routes directly to the MRTM 208 via the API 209. The API 209, in connection with the MRTM 208, provides the processes and logic to insert routes into the MRTM routing table, delete routes from the MRTM routing table and change routes in the MRTM routing table. As the routes, multicast or unicast, in the MRTM routing table are changed (i.e. updated, added or deleted), each multicast routing protocol using the MRTM routing table will be notified of such change. An exemplary method for synchronizing any route changes in the MRTM routing table with the plurality of multicast routing protocols using the MRTM routing table is discussed in co-pending U.S. patent application Ser. No. 09/474,350, filed on even date herewith, entitled "Method and Apparatus for Synchronization of Multicast Routing Table Changes with a Plurality of Multicast Routing Protocols," which is hereby incorporated by reference.

When a multicast route is submitted to the MRTM 208 via the API 209, the MRTM 208 will determine whether the multicast route should be added, deleted or updated. The MRTM 208 searches the existing MRTM routing table 210 to determine if the submitted multicast route already has an entry in the MRTM routing table 210. If an entry for the specific multicast route already exists, the MRTM 208 will update the route entry with any changes to the parameters of the multicast route. If an entry for the specific multicast route does not exist and the route weight associated with the multicast route is not unreachable, then a new entry is created in the MRTM routing table 210 for the submitted route. A route will be removed from the MRTM routing table when the network associated with the route becomes unreachable.

When a route entry is added to the MRTM routing table 210, the MRTM 208 sorts the route submitted based on the address of the route and the type of routing protocol associated with the route. A preference is associated with each routing protocol. The route entries of the MRTM routing table 210 are stored in descending order based on preference, i.e., which route is a preferred path. In addition, the MRTM 208 will identify the best route based on the preferences associated with each routing protocol.

As mentioned above, when a submitted multicast route is added to the MRTM routing table 210, a route entry is created to store the routing information associated with the submitted multicast route. In an exemplary embodiment of the invention, an entry in the MRTM routing table includes information such as, the IP address of the route source network, the IP address of the next hop of the route, the current route state, the current route metric and the routing protocol associated with the route.

The MRTM routing table 210 may also include selected unicast routes from the unicast routing table 204. As discussed previously, some multicast routing protocols make use of unicast routes, as well as multicast routes. The unicast routing table 204, however, does not directly submit its routes to the MRTM routing table 210. Alternatively, the unicast routes are selectively injected into the MRTM routing table 210 using a memory buffer 206 and a policy filter 207 coupled between the unicast routing table 204 and the MRTM routing table 210.

Figure 3:
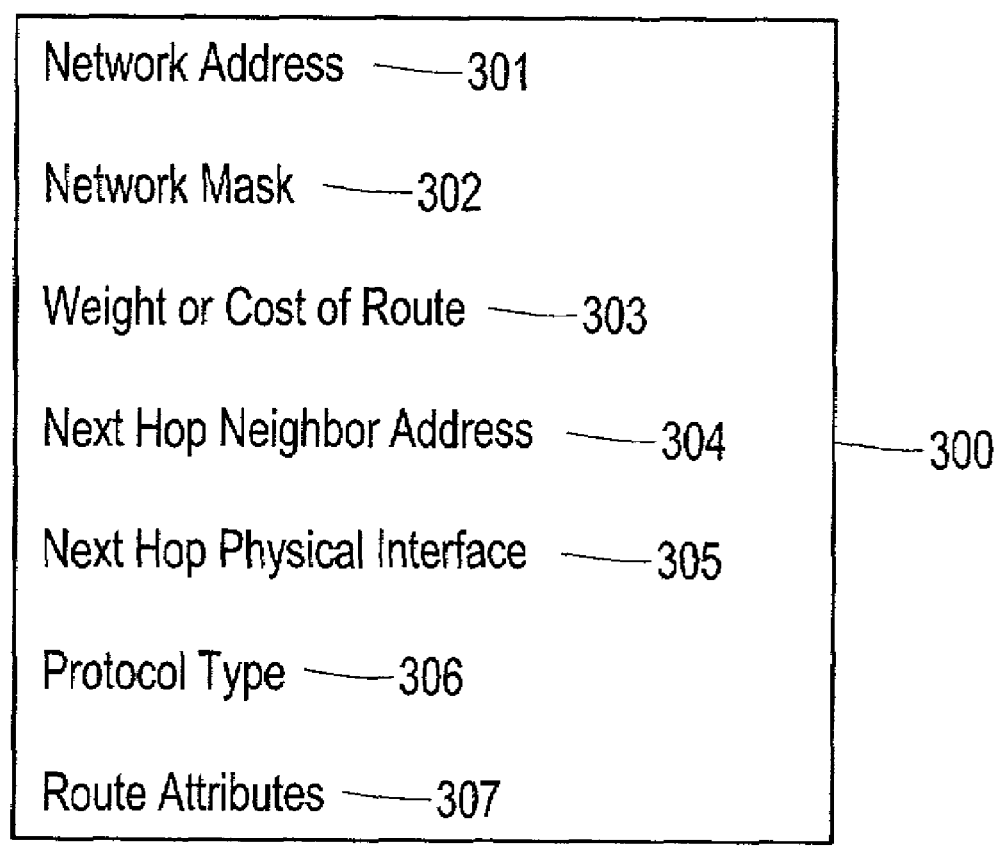
FIG. 3 illustrates an exemplary entry in a memory buffer used to transfer unicast routes to a multicast routing table in accordance with an embodiment of the invention.

The memory buffer 206 is used to transfer the best unicast routes from the unicast routing table 204 to the MRTM routing table 210. In one embodiment, the memory buffer 206 is a FIFO. The MRTM 208 requests from the RTM 205 a set of unicast routes that should be stored in the memory buffer 206. In one embodiment, the unicast routes are selected based on the type of protocol associated with the route. The desired protocol type is identified as "requested" by the MRTM 208. The RTM 205 will then submit the unicast routes associated with that protocol type to the memory buffer 206. Each selected unicast route is stored in the memory buffer 206 using a memory record that preferably contains a minimal amount of routing information. FIG. 3 illustrates an exemplary record in the memory buffer used to transfer unicast routes to a multicast routing table in accordance with an embodiment of the invention.

The memory record 300 stores information related to a unicast route such as network address 301, network mask 302, the weight or cost of the route 303, the next hop neighbor address 304 for the route, the next hop physical interface 305 for the route, the protocol type 306 and the route attributes 307. The information stored in the memory record 300 may be used to modify the attributes of the unicast route using a policy filter 207. Returning to FIG. 2, the MRTM sends the unicast routes stored in the memory buffer to the policy filter 207. In one embodiment, the policy filter 207 may be used to remove selected routes or modify the weight or cost value of each route. As discussed above, the weight or preference of the route is used by the MRTM 208 to sort the routes stored in the MRTM routing table 210.

The MRTM 208 reads the stored unicast information from the memory buffer 206 and, as it does with the submitted multicast routes, then determines whether the unicast route should be added, deleted, or updated. The MRTM 208 searches the existing MRTM routing table 210 to determine if the submitted unicast route already has an entry in the MRTM routing table 210. If an entry for the specific unicast route already exists, the MRTM 208 will update the route entry with any changes to the unicast route. In an entry for the specific unicast route does not exist and the route weight associated with the unicast route is not unreachable, then a new entry is created in the MRTM routing table 210 for the injected unicast route. As discussed previously, a route will be removed from the MRTM routing table 210 when the network associated with the unicast route becomes unreachable.

Figures 4, 5:
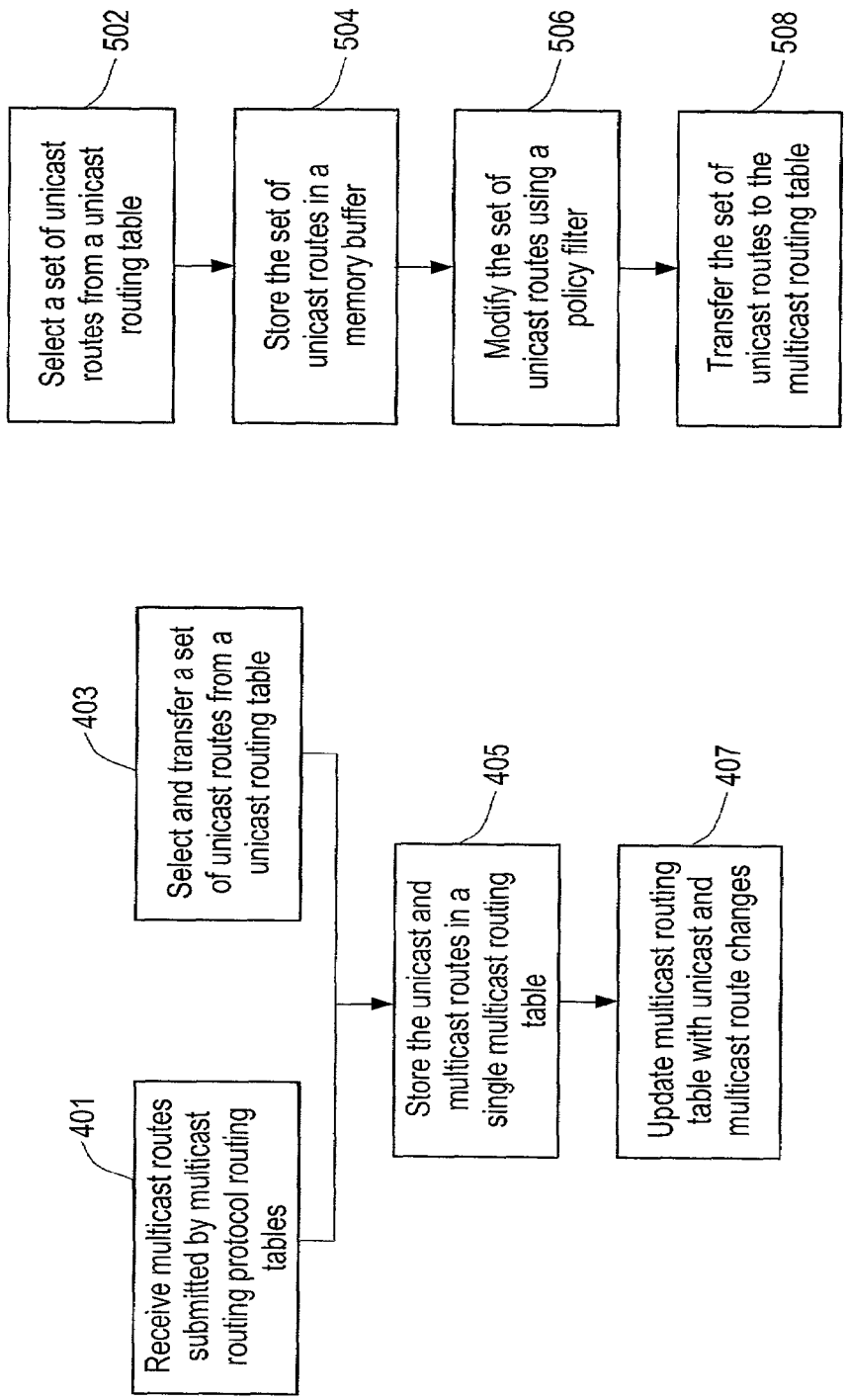
FIG. 4 illustrates the flow of control of a method for managing routing information for a plurality of multicast routing protocols using multicast and unicast routes in a network device in accordance with an embodiment of the invention.
FIG. 5 illustrates the flow of control of a method for selecting and injecting unicast routes into a multicast routing table in accordance with an embodiment of the invention.

FIG. 4 illustrates the flow of control of a method for managing routing information for a plurality of multicast routing protocols using multicast and unicast routes in a network device in accordance with an embodiment of the invention. At block 401, multicast routes are submitted by routing tables associated with a plurality of multicast routing protocols. The multicast protocols determine the best route or routes for a forwarded multicast packet. As discussed above, a multicast routing protocol, such as DVMRP and MBGP, maintains its own routing table that stores multicast routes known to the multicast routing protocol. Each multicast routing protocol will submit the routes from its routing table to a single multicast routing table. Certain multicast routing protocols also make use of unicast routes. Accordingly, at block 403, a set of unicast routes are selected from a unicast routing table and transferred to the multicast routing table. In one embodiment, the set of unicast routes are selected based on the unicast protocol associated with the unicast routes. At block 405, the submitted multicast routes and the set of unicast routes are advantageously stored in the multicast routing table. The multicast routing table provides a common location for the multicast and unicast routes to be obtained by each multicast routing protocol. As discussed previously, this reduces the amount of processing time and logic required to determine the desired routes or routes for a multicast packet. At block 407, the multicast routing table is updated with any route changes in the unicast and multicast routes. A discussed with respect to FIG. 2, in one embodiment of the invention, the content of the multicast routing table is controlled by a multicast routing table manager.

Returning to block 403, the set of unicast routes must be transferred to the multicast routing table from the unicast routing table. FIG. 5 illustrates the flow of control of a method for selecting and injecting unicast routes into a multicast routing table in accordance with an embodiment of the invention. At block 502, the set of unicast routes are selected from a unicast routing table. In one embodiment, the set of unicast routes are selected based on the unicast routing protocol associated with the unicast protocols. At block 504, the set of unicast protocols are stored in a memory buffer. In one embodiment, the memory buffer is a FIFO. As discussed above, with respect to FIG. 2, routing information relating to a unicast route is stored in a memory entry. Preferable, the memory entry contains a minimal amount of routing information. Before the unicast routes are transferred to the multicast routing table, at block 508, the set of unicast routes may be modified at block 506 using a policy filter. At block 508, the set of unicast routes are transferred from the memory buffer to the multicast routing table. As mentioned above, it is advantageous to store the multicast routes and unicast routes associated with a plurality of multicast routing protocols in one multicast routing table as opposed to separately maintained routing tables specific to each multicast routing protocol.

In an exemplary embodiment of the invention, the MRTM is managed through a Management Information Base (MIB). The MIB defines various management objects for configuring and controlling various multicast route management functions. Specifically, an exemplary MIB defines management objects for configuring and controlling various multicast route management functions. Specifically, an exemplary MIB defines management objects for configuring and controlling the selection and injection of unicast routes, the submission of multicast routes and the creation of a MRTM routing table.

An exemplary MIB for configuring and controlling the MRTM is shown in FIGS. 6A–6G. The MB defines various management objects, some of which are organized as tables within the MB. Specifically the MIB defines a MRTM Inject Route Table (wfIpMrtmInjectRtTable) and a MRTM routing table (wfMRTM).

The MRTM Inject Route Table (wfIpMrtmInjectRtTable) is used to configure and control the policy rules governing the injection of unicast routes into the MRTM routing table. Each MRTM Inject Route Table entry corresponds to a particular unicast route injection policy rule, and includes a management object (wfIpMrtmInjectRtDelete) to create a or delete a route entry, a management object (wfIpMrtmInjectRtDisable) to enable or disable a route entry, a management object (wfIpMrtmInjectRtIndex) indicating a rule index number, a management object (wfIpMrtmInjectRtName) indicating the specified name for the rule, a management object (wfIpMrtmInjectRtNetworks) indicating the list of networks that match the rule, a management object (wfIpMrtmInjectRtAction) to accept or ignore a route, a management object (wfIpMrtmInjectRtPreference) indicating the preference associated with a route, a management object (wfIpMrtmInjectRtPrecedence) indicating a precedence value for the rule, a management object (wfIpMrtmInjectRtInject) indicating a network replacement list, a management object (wfIpMrtmInjectRtInterface) indicating an injected unicast routes inbound circuit, a management object (wfIpMrtmInjectRtType) indicating a unicast route type to be selected from the RTM, and a management object (wfIpMrtmInjectRt Metric) indicating the cost of the route to be injected into the MRTM routing table.

The exemplary MIB of FIGS. 6E–6G also defines management objects to configure and control the MRTM (routing) table (wfMrtm) and includes a management object (wfMrtmCreate) to create or delete the MRTM logic, a management object (wfMrtmEnable) to enable or disable the MRTM logic, a management object (wfMrtmState) indicating the current state of the entire MRTM, a management object (wfMrtmDebug) for generating log messages, a management object (wfMrtmHoldDownTime) indicating how long a route will be held in the MRTM table after it becomes unreachable, a management object (wfMrtmFifoSize) indicating the size of the FIFO used to transfer unicast routes from the RTM to the MRTM, a management object (wfMrtmEstimatedNetworks) indicating the estimated number of routes the router will need to keep in its routing table, a management object (wfMrtmMaxRoutes) indicating the maximum number of routes per slot, and a management object (wfMrtmActualRoutes) indicating the total actual entries currently in the routing table.

In a preferred embodiment of the invention, predominantly all of the logic for aggregating and maintaining routing information for a plurality of multicast routing protocols in a network device is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be noted that the term "packet" is used herein generically to describe various protocol messages that are processed by a communication device, and should not be construed to limit application of the present invention to a specific protocol message format or communication protocol. Thus, a "packet" may be any protocol message including, but not limited to, a frame, a packet, a datagram, a user datagram or a cell.

It should also be noted that the terms "router" and "switch" are used herein generically to describe any of a variety of devices that implement the described protocols and procedures for forwarding a multicast packet, and should not be construed to limit application of the present invention to any specific type of device.

Thus, the present invention may be embodied as a method for aggregating and maintaining routing information for a plurality of multicast routing protocols in a network device that includes a routing table for each of the plurality of multicast routing protocols. The method involves receiving routes from each routing table for the plurality of multicast routing protocols, storing the routes in a single multicast routing table and updating the multicast routing table based on changes made by the plurality of multicast routing protocols to the routes stored in each routing table for the plurality of multicast routing protocols.

The present invention may be embodied as an apparatus for aggregating and maintaining routing information for a plurality of multicast routing protocols in a network device that includes a routing table for each of the plurality of multicast routing protocols. The device includes receiving logic for receiving routes from each routing table for the plurality of multicast routing protocols, a multicast routing table for storing the routes received from each routing table for the plurality of multicast routing protocols, and multicast routing table management logic for updating the multicast routing table based on the changes made by the plurality of multicast routing protocols to the routes stored in the routing tables for the plurality of multicast routing protocols.

The present invention may also be embodied as a computer program product comprising a computer readable medium having embodied therein a computer program for aggregating and maintaining routing information for a plurality of multicast routing protocols in a network device that includes a routing table for each of the plurality of multicast routing protocols. The computer program includes program code for receiving routes from each routing table for the plurality of multicast routing protocols, program code for storing the routed in a single multicast routing table and program code for updating the multicast routing table based on changes made by the plurality of multicast routing protocols to the routes stored in each routing table for the plurality of multicast routing protocols.

The present invention may be embodied as a communication system comprising at least one multicast device for forwarding multicast packets using a plurality of multicast routing protocols. The multicast device includes a single multicast routing table for storing multicast routes for the plurality of multicast routing protocols. Multicast routing table management logic updates the multicast routing table based on changes made by the plurality of multicast routing protocols to the routes stored in the multicast routing table.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for aggregating and maintaining routing information for a plurality of multicast routing protocols in a network device of a multicast communication network, the network device including a routing table for each of the plurality of multicast routing protocols, the method comprising:

receiving routes submitted by each routing table for the plurality of multicast routing protocols;

storing the routes in a single multicast routing table; and updating the multicast routing table based on changes made by the plurality of multicast routing protocols to the routes stored in each routing table for the plurality of routing protocols.

2. A method according to claim 1, further including sorting the routes stored in the multicast routing table based on routing protocol type.

3. A method according to claim 1, further including:

selecting a set of unicast routes from a unicast routing table;

storing the set of unicast routes in a memory buffer; and transferring the set of unicast routes from the memory buffer to the multicast routing table.

4. A method according to claim 3, further including updating the multicast routing table based on changes made to the set of unicast routes.

5. A method according to claim 3, wherein transferring the set of unicast routes includes modifying the set of unicast routes based on a set of predetermined criteria.

6. A method according to claim 3, wherein the memory buffer is a FIFO.

7. A method according to claim 3, wherein the set of unicast routes are selected based on a unicast routing protocol associated with each unicast route.

8. An apparatus for aggregating and maintaining routing information for a plurality of multicast routing protocols in a network device of a multicast communication network, the network device including a routing table for each of the plurality of multicast routing protocols, the apparatus comprising:
   receiving logic for receiving routes submitted by each routing table for the plurality of multicast routing protocols;
   a multicast routing table, operably coupled to the receiving logic, for storing the routes received from each routing table for the plurality of multicast routing protocols; and
   multicast routing table management logic operably coupled to the multicast routing table, the multicast routing table management logic for updating the multicast routing table based on changes made by the plurality of multicast routing protocols to the routes stored in each routing table for the plurality of multicast routing protocols.

9. An apparatus according to claim 8, wherein the multicast routing table management logic includes sorting logic for sorting the routes stored in the multicast routing table based on routing protocol type.

10. An apparatus according to claim 8, further including:
    a memory buffer operably coupled to a unicast routing table and the multicast routing table, the memory buffer for storing a set of unicast routes selected from the unicast routing table;
    wherein the set of unicast routes are transferred from the memory buffer to the multicast routing table.

11. An apparatus according to claim 10, wherein the multicast routing table management logic updates the multicast routing table based on changes to the set of unicast routes.

12. An apparatus according to claim 10, further including a policy filter operably coupled to the memory buffer and the multicast routing table, the policy filter for modifying the set of unicast routes based on a set of predetermined criteria.

13. An apparatus according to claim 10, wherein the memory buffer is a FIFO.

14. An apparatus according to claim 10, wherein the set of unicast routes are selected based on a unicast routing protocol associated with each unicast route.

15. A computer program product for use on a computer system for aggregating and maintaining routing information for a plurality of multicast routing protocols in a network device of a multicast communication network, the network device including a routing table for each of the plurality of multicast routing protocols, the computer program product comprising a computer useable medium having computer readable code thereon, the computer readable program code including:
    program code for receiving routes submitted by each routing table for the plurality of multicast routing protocols;
    program code for storing the routes in a single multicast routing table; and program code for updating the multicast routing table based on changes made by the plurality of multicast routing protocols to the routes stored in each routing table for the plurality of multicast routing tables.

16. A computer program product according to claim 15, further including program code for sorting the routes stored in the multicast routing table based on routing protocol type.

17. A computer program product according to claim 15, further including:
    program code for selecting a set of unicast routes from a unicast routing table;
    program code for storing the set of unicast routes in a memory buffer; and program code for transferring the set of unicast routes from the memory buffer to the multicast routing table.

18. A computer program product according to claim 17, further including program code for updating the multicast routing table based on changes made to the set of unicast routes.

19. A computer program product according to claim 17, wherein transferring the selected unicast routes includes modifying the set of unicast routes based on a set of predetermined criteria.

20. A computer program product according to claim 17, wherein the memory buffer is a FIFO.

21. A computer program product according to claim 17, wherein the set of unicast routes are selected based on the unicast routing protocol associated with each unicast route.

22. A device comprising:
    a set of protocol specific routing tables, each routing table storing multicast routes for a specific multicast routing protocol;
    receiving logic for receiving the routes submitted by each protocol specific routing table in the set of protocol specific routing tables;
    a multicast routing table, operable coupled to the receiving logic, the multicast routing table for storing the routes received from each protocol specific routing table; and
    multicast routing table management logic for updating the multicast routing table based on changes made to the routes in each protocol specific routing table.

23. A method for injecting unicast routes from a unicast routing table into a multicast routing table in a network device of a multicast communications network, the method comprising:
    selecting a set of unicast routes from the unicast routing table;
    storing the set of unicast routes in a memory buffer; and
    transferring the set of unicast routes from the memory buffer to the multicast routing table.

24. A method according to claim 23, wherein transferring the set of unicast routes includes modifying the set of unicast routes based on a set of predetermined criteria.

25. A method according to claim 23, wherein the memory buffer is a FIFO.

26. A method according to claim 23, wherein the set of unicast routes are selected based on the unicast routing protocol associated with each route in the set of unicast routes.

27. An apparatus for injecting unicast routes from a unicast routing table into a multicast routing table in a network device of a multicast communication network, the apparatus comprising:
    selection logic for selecting a set of unicast routes from the unicast routing table, a memory buffer, operably coupled to the unicast routing table and the multicast routing table, the memory buffer for storing the set of unicast routes selected from the unicast routing table; and transferring logic, operably coupled to the memory buffer, for transferring the set of unicast routes from the memory buffer to the multicast routing table.

28. An apparatus according to claim 27, wherein the transferring logic includes a policy filter for modifying the set of unicast routes based on a set of predetermined criteria.

29. An apparatus according to claim 27, wherein the memory buffer is a FIFO.

30. An apparatus according to claim 27, wherein the set of unicast routes are selected based on the unicast routing protocol associated with each unicast route.

31. A computer program product for use on a computer system for injecting unicast routes from a unicast routing table into a multicast routing table in a network device of a multicast communication network, the computer program product comprising a computer useable medium having computer readable program code thereon, the computer readable program code including:

program code for selecting a set of unicast routes from the unicast routing table;

program code for storing the set of unicast routes in a memory buffer; and program code for transferring the set of unicast routes from the memory buffer to the multicast routing table.

32. A computer program product according to claim 31, wherein transferring the selected unicast routes includes modifying the set of unicast routes based on a set of predetermined criteria.

33. A computer program product according to claim 31, wherein the memory buffer is a FIFO.

34. A computer program product according to claim 31, wherein the set of unicast routes are selected based on a unicast routing protocol associated with each unicast route.

35. A communication system comprising at least one multicast device, the multicast device for forwarding multicast packets using a plurality of multicast routing protocols, the multicast device comprising:

a single multicast routing table for storing multicast routes for the plurality of multicast routing protocols; and multicast routing table management logic for updating the multicast routing table based on changes made by the plurality of multicast routing protocols to the routes stored in the multicast routing table.

36. A communication system according to claim 35, wherein the multicast routing table management logic sorts the routes stored in the multicast routing table based on routing protocol type.

37. A communication system according to claim 35, wherein the multicast routing table stores unicast routes related to the plurality of multicast routing protocols.

38. A management information base for configuring a multicast routing table manager for a plurality of multicast routing protocols, the management information base storing on a computer readable medium comprising:

at least one management object for defining a multicast routing table manager including a multicast routing table for storing routes for the plurality of multicast routing protocols; and at least one management object for defining a set of rules for the injection of routes into the multicast routing table.

39. A management information base according to claim 38, wherein the at least one management object defining a multicast routing table comprises:

a management object defining a state of the multicast routing table.

40. A management information base according to claim 38, wherein the at least one management object defining a multicast routing table comprises:

a management object indicating the maximum number of entries in the multicast routing table.

41. A management information base according to claim 38, wherein the at least one management object defining a multicast routing table comprises:

a management object (WfMrtmCreate) to create or delete multicast routing table manager logic;

a management object (WfMrtmEnable) to enable or disable the multicast routing table manager logic;

a management object (WfMrtmState) indicating a state of the multicast routing table;

a management object (WfMrtmDebug) for generating log messages;

a management object (WfMrtmHoldDownTime) indicating how long a route will be held in the multicast routing table when it becomes reachable;

a management object (WfMrtmFifoSize) indicating a size of a FIFO used to transfer routes from a unicast routing table to the multicast routing table;

a management object (WfMrtmEstimated Networks) indicating a estimated number of routes needed for a network device to retain the multicast routing table;

a management object (WfMrtmMaxRoutes) indicating a total number of routes in the multicast routing table; and a management object (WfMrtmMaxRoutes) indicating a total number of routes in the multicast routing table.

42. A management information base according to claim 38, wherein the at least one management object defining a set of rules comprises:

a management object indicating whether to accept or ignore a route.

43. A management information base according to claim 38, wherein the at least one management object defining a set of rules comprises:

a management object (WfIpMrtmInjectDelete) to create or delete a route entry;

a management object (WfIPMrtmInjectRtDisable) to enable or disable the route entry;

a management object (WfIpMrtmInjectRtIndex) indicating a rule index number;

a management object (WfIpMrtmInjectRtName) indicating a name for the rule;

a management object (WfIpMrtmInjectRtNetworks) indicating a list of networks that match the rule;

a management object (WfIpMrtmInjectRtAction) to accept or ignore a route;

a management object (WfIpMrtmInjectRtPreference) indicating a preference associated with a route;

a management object (WfIpMrtmInjectRtPrecedence) inditing a precedence value for the rule;

a management object (WfIpMrtmInjectRtInject) indicting a network replacement list;

a management object (WfIpMrtmInjectRtInInterface) indict an injected unicast routes inbound circuit;

a management object (WfIpMrtmInjectRtTYpe) indicating a unicast route type to be selected from a unicast routing table; and a management object (WfIpMrtmInjectRtMetric) indicating a cost of the route to be injected into the multicast routing table.

* * * * *

UNITED STATES PATENT AND TRADEMARK OFFICE
CERTIFICATE OF CORRECTION

PATENT NO.         : 7,099,323 B1
APPLICATION NO.    : 09/742881
DATED              : August 29, 2006
INVENTOR(S)        : Doong et al.

It is certified that error appears in the above-identified patent and that said Letters Patent is hereby corrected as shown below:

Column 12, line 66: should read the unicast routing tablet ; a memory buffer

Column 14, line 28: should read maximum number of routes

Column 14, line 30: should read a management object (WfMrtmActualRoutes)

Column 14, line 55, should read indicating a

Column 14, lines 56, 57: should read indicating

Signed and Sealed this

Second Day of January, 2007

JON W. DUDAS
*Director of the United States Patent and Trademark Office*